US006832194B1

(12) United States Patent
Mozer et al.

(10) Patent No.: US 6,832,194 B1
(45) Date of Patent: Dec. 14, 2004

(54) AUDIO RECOGNITION PERIPHERAL SYSTEM

(75) Inventors: Forrest S. Mozer, Berkeley, CA (US); Robert E. Savoie, Los Altos Hills, CA (US); William T. Teasley, Sunnyvale, CA (US)

(73) Assignee: Sensory, Incorporated, Santa Clara, CA (US)

( * ) Notice: Subject to any disclaimer, the term of this patent is extended or adjusted under 35 U.S.C. 154(b) by 368 days.

(21) Appl. No.: 09/699,249

(22) Filed: Oct. 26, 2000

(51) Int. Cl.[7] ............................................. G10L 21/00
(52) U.S. Cl. .................... 704/270; 704/221; 704/213; 704/244; 704/230; 704/274; 712/38; 712/288; 712/213; 712/205
(58) Field of Search ............................. 704/221, 213, 704/230, 274, 270, 246, 244; 712/38, 228, 213, 205

(56) References Cited

U.S. PATENT DOCUMENTS

| | | | |
|---|---|---|---|
| 4,489,435 A | * | 12/1984 | Moshier ...................... 704/244 |
| 5,091,947 A | * | 2/1992 | Ariyoshi et al. ............. 704/246 |
| 5,319,789 A | * | 6/1994 | Ehlig et al. .................. 712/228 |
| 5,384,834 A | * | 1/1995 | Sato et al. ................ 379/88.21 |
| 5,749,064 A | * | 5/1998 | Pawate et al. ............... 704/213 |
| 5,790,754 A | | 8/1998 | Mozer et al. |
| 5,893,064 A | * | 4/1999 | Kudirka et al. .......... 704/270.1 |
| 6,006,185 A | | 12/1999 | Immarco |
| 6,032,115 A | | 2/2000 | Kanazawa et al. |
| 6,041,299 A | | 3/2000 | Schuster et al. |
| 6,044,343 A | | 3/2000 | Cong et al. |
| 6,044,346 A | * | 3/2000 | Ali et al. ..................... 704/270 |
| 6,061,653 A | | 5/2000 | Fisher et al. |
| 6,064,729 A | | 5/2000 | Cookson |
| 6,067,513 A | | 5/2000 | Ishimitsu |
| 6,085,314 A | * | 7/2000 | Asghar et al. ............... 712/213 |
| 6,154,830 A | * | 11/2000 | Sugimura .................... 712/205 |
| 6,249,859 B1 | * | 6/2001 | Boutaud et al. ............... 712/38 |
| 6,330,247 B1 | * | 12/2001 | Chang et al. ................ 370/442 |
| 6,397,186 B1 | * | 5/2002 | Bush et al. .................. 704/274 |
| 6,411,926 B1 | * | 6/2002 | Chang ......................... 704/221 |
| 6,496,798 B1 | * | 12/2002 | Huang et al. ................ 704/230 |

OTHER PUBLICATIONS

Suen et al., "a programmable application–specific VLSI architecture and implementation for speech word–recognizer", Design automation conference 1997. proceeding the ASP–DAC '97, IEEE, pp 71–75.*

Sensory, Inc., *Speech Recognition Microcontroller*, RSC–300/364 Data Sheet, *Interactive Speech™*, pp. 1–8.

* cited by examiner

*Primary Examiner*—Richemond Dorvil
*Assistant Examiner*—Qi Han
(74) *Attorney, Agent, or Firm*—Fountainhead Law Group; Chad R. Walsh (57) ABSTRACT

The present invention includes a novel audio recognition peripheral system and method. The audio recognition peripheral system comprises an audio recognition peripheral a programmable processor such as a microprocessor or microcontroller. In one embodiment, the audio recognition peripheral includes a feature extractor and vector processor. The feature extractor receives an audio signal and extracts recognition features. The extracted audio recognition features are transmitted to the programmable processor and processed in accordance with an audio recognition algorithm. During execution of the audio recognition algorithm, the programmable processor signals the audio recognition peripheral to perform vector operations. Thus, computationally intensive recognition operations are advantageously offloaded to the peripheral.

56 Claims, 4 Drawing Sheets

AUDIO RECOGNITION PERIPHERAL SYSTEM

BACKGROUND OF THE INVENTION

The field of the present invention is integrated circuits for implementing audio recognition. More particularly, the present invention includes an apparatus and method of providing an audio recognition peripheral system allowing for a highly efficient implementation of an audio recognition process.

Audio recognition systems are widely used for providing computers and other electronic systems with the ability to receive audio input signals and perform operations in response to the particular characteristics of the audio input signal. One common application of audio recognition is speech recognition, for example. Using a speech recognition system, a computer or other electronic system may receive an audio input signal corresponding to speech and respond to the input signal in accordance with the specific speech that was received. For example, a user may provide spoken commands to a computer and using a speech recognition algorithm the computer may execute different functions in response different commands.

However, audio recognition systems are problematic to realize because they typically require large amounts of data processing to implement. For example, in one prior art implementation, an audio signal is digitized and provided as an input to a microprocessor. The microprocessor performs the speech recognition using software algorithms that operate on the digitized audio signal. This approach has the disadvantage of consuming large amounts resources and/or processor time in the microprocessor, thereby slowing down the performance of the overall system.

In another prior art implementation of an audio recognition system, an application specific audio recognition integrated circuit is used that incorporates a dedicated microprocessor with special hardware and software for performing the audio recognition operations. However, application specific audio recognition systems have the disadvantage of increasing the costs of the overall system. Moreover, application specific audio recognition systems are difficult to integrate into larger systems because of compatibility issues between the operating characteristics of the different devices in the system. Additionally, an application specific audio recognition integrated circuit will often be integrated into an electronic system controlled by a main processor. However, as the applications on the main processor are modified, additional modifications and adaptations on the application specific audio recognition integrated circuit may be required to conform to software changes in the main processor. Such modifications can be difficult, costly, and time consuming, and can make the overall electronic system costly and inflexible. Finally, application specific audio recognition systems typically have their own programming environments that users must learn in order to implement audio recognition functionality. Therefore, design cycles are increased in the development of new systems with a corresponding increase in cost.

Therefore, what is needed is an audio recognition system that allows users to efficiently implement audio recognition functionality into larger systems at reduced costs with both ease and flexibility of use.

SUMMARY OF THE INVENTION

Embodiments of the present invention solve the problems described above with respect to previously known systems and methods for implementing audio recognition. Specifically, the present invention provides an audio recognition peripheral and audio recognition peripheral system. The present invention allows system designers to easily add audio recognition functionality into a system by simply adding a low cost audio recognition peripheral to operate in conjunction with a processor.

In one embodiment the present invention includes an audio recognition peripheral system comprising a first integrated circuit having a programmable processing unit, the programmable processing unit loading an audio recognition algorithm to perform an audio recognition operation, and a second integrated circuit having a feature extractor coupled to the first integrated circuit, the second integrated circuit receiving an audio signal and extracting audio recognition features from the audio signal to produce feature extraction data, wherein the programmable processing unit receives the feature extraction data and executes the audio recognition algorithm on the feature extraction data.

In another embodiment, the second integrated circuit of the audio recognition peripheral system includes an interface controller coupled to the feature extractor and to the first integrated circuit, the interface controller operating in response to control signals received from the first integrated circuit.

In another embodiment, the second integrated circuit of the audio recognition peripheral system includes a vector processor coupled to the first integrated circuit, wherein interface information is received by the interface controller and includes information for configuring the vector processor to perform a specified operation during execution of the audio recognition algorithm by the programmable processing unit.

In one embodiment, the present invention includes an audio recognition peripheral on a single integrated circuit comprising a feature extractor, having an audio input for receiving an audio signal, the feature extractor extracting audio recognition features from the audio signal to produce feature extraction data, and an interface controller coupled to the feature extractor, the interface controller having an interface input for receiving external control signals and interface information, wherein the control signals and interface information configure the feature extractor to operate in accordance with an external audio recognition algorithm.

In another embodiment, when the audio recognition peripheral is in an extraction mode a filter unit receives an audio signal to generate feature extraction data, and when the audio recognition peripheral is in a synthesis mode the filter unit receives an excitation signal to generate audio information.

In another embodiment, the audio recognition peripheral further comprises a synthesizer for receiving digital audio information and producing an external analog audio output signal.

In another embodiment, the audio recognition peripheral further comprises a vector processor coupled to the interface controller. In yet another embodiment, the audio recognition peripheral further comprises a memory coupled to the vector processor.

In one embodiment, the present invention includes an audio recognition method comprising loading an audio recognition algorithm in a first integrated circuit, the first integrated circuit having a programmable processing unit, transmitting control signals and interface information from the first integrated circuit to a second integrated circuit having a feature extractor, and in accordance therewith, configuring the second integrated circuit to extract audio recognition features, receiving an audio signal in the feature extractor of the second integrated circuit, extracting audio recognition features from the audio signal to produce feature extraction data, transmitting the feature extraction data from the second integrated circuit to the first integrated circuit, and executing the audio recognition algorithm on the feature extraction data in the first integrated circuit.

In one embodiment, the present invention includes a method of processing an audio signal on a single integrated circuit for audio recognition comprising receiving external control signals and interface information in a interface controller corresponding to the external execution of an audio recognition algorithm, and in accordance therewith, configuring a feature extractor, receiving the audio signal in the feature extractor, extracting audio recognition features from the audio signal to produce feature extraction data, and transmitting the feature extraction data external to the integrated circuit.

These and other embodiments of the present invention, as well as its advantages and features, are describe in more detail in conjunction with the text below and attached figures.

DESCRIPTION OF THE SPECIFIC EMBODIMENTS

Figure 1:
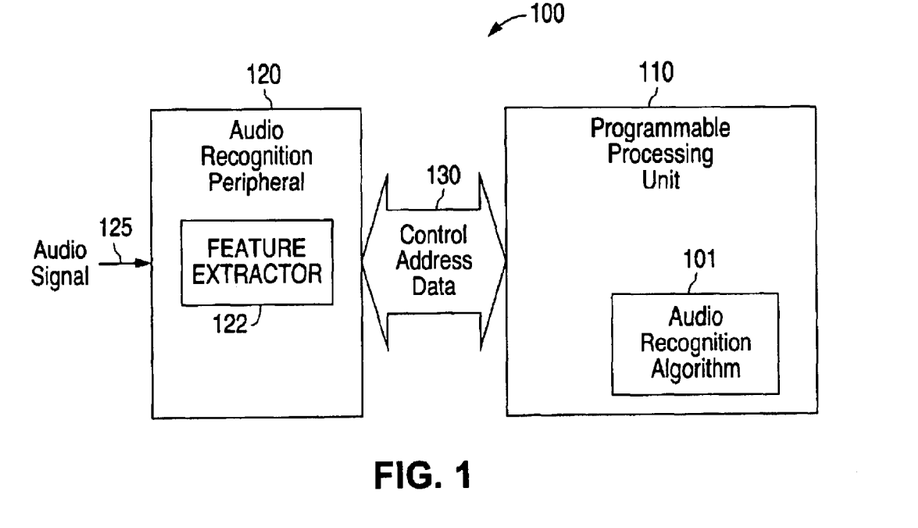
FIG. 1 illustrates a block diagram of an audio recognition peripheral system according to one embodiment of the present invention.

FIG. 1 shows a block diagram of an audio recognition peripheral system 100 according to one embodiment of the present invention. Audio recognition peripheral system 100 includes a programmable processing unit 110 on a first integrated circuit coupled to an audio recognition peripheral 120 on a second integrated circuit through a bus 130. The bus 130 may be any bus included on the particular programmable processing unit 110 chosen by the system designer. An audio signal 125 is input to the recognition peripheral 120 and received by a feature extractor 122 residing on the recognition peripheral 120.

The audio recognition peripheral system 100 of FIG. 1 is highly advantageous to system designers because it allows system designers to add audio recognition functionality into any system having a general purpose programmable processor, such as a microprocessor or microcontroller, without severely loading down the processor's resources and without drastically increasing the final system cost or design time cost. Accordingly, in one embodiment, the functionality and/or features of a particular product may be implemented by a general purpose programmable processor, and audio recognition functionality partitioned between the processor and the audio recognition peripheral. For example, a microprocessor may implement some or all of the functional (i.e. operational) flow for a particular product. In other words, the microprocessor controls the flow of how the features and/or functions of the product are implemented. The designer of the product can add audio recognition functionality simply by coupling the microprocessor to the audio recognition peripheral over the microprocessor's bus, and then accessing and/or executing an audio recognition algorithm as required during execution of the products functional flow to incorporate audio recognition.

To execute an audio recognition operation, audio recognition peripheral system 100 loads an audio recognition algorithm 101 into the programmable processing unit 110 from an external memory (not shown). As part of an audio recognition operation, the programmable processing unit 110 also transmits control signals and interface information to the audio recognition peripheral 120 over the general purpose bus 130. The general purpose bus 130 may comprise control, address, and data information. The bus 130 may include either distinct control, address, and data lines or parallel lines carrying the combination of control/address/data. Additionally, the bus 130 may be comprised of partitioned combinations thereof such as distinct control lines and combined address/data lines. Of course, a serial bus may also be employed. The control signals and interface information are received by the audio recognition peripheral 120, and in accordance therewith, the feature extractor 122 can be configured to extract audio recognition features from the audio signal 125.

During execution of an audio recognition operation, the audio signal 125 is input to the feature extractor 122 on the audio recognition peripheral 120. The feature extractor 122 receives the audio signal 125 and extracts audio recognition features to produce feature extraction data. The feature extraction data is transmitted over the general purpose bus 130 from the audio recognition peripheral 120 to the programmable processing unit 110 for use in the audio recognition algorithm 101. Once the feature extraction data has been received by the processing unit 110, the audio recognition algorithm is executed on the feature extraction data.

Therefore, in accordance with one embodiment of the present invention, the feature extraction portion of the audio recognition operation is removed from the programmable processing unit 110 and implemented on the audio recognition peripheral 120, thereby drastically reducing the resource loading on the programmable processing unit 110. Moreover, by coupling the audio recognition peripheral 120 to a programmable processing unit 110 through a bus 130 included on the particular processing unit chosen by the system designer, the present invention allows system designers to add audio recognition functionality to their systems simply by adding a low cost audio recognition peripheral integrated circuit to run alongside the processing unit. Finally, by loading and executing the audio recognition algorithm on a programmable processing unit 110, the need for application specific integrated circuits that incorporate a dedicated microprocessor for performing the audio recognition functions is eliminated.

Figure 2:
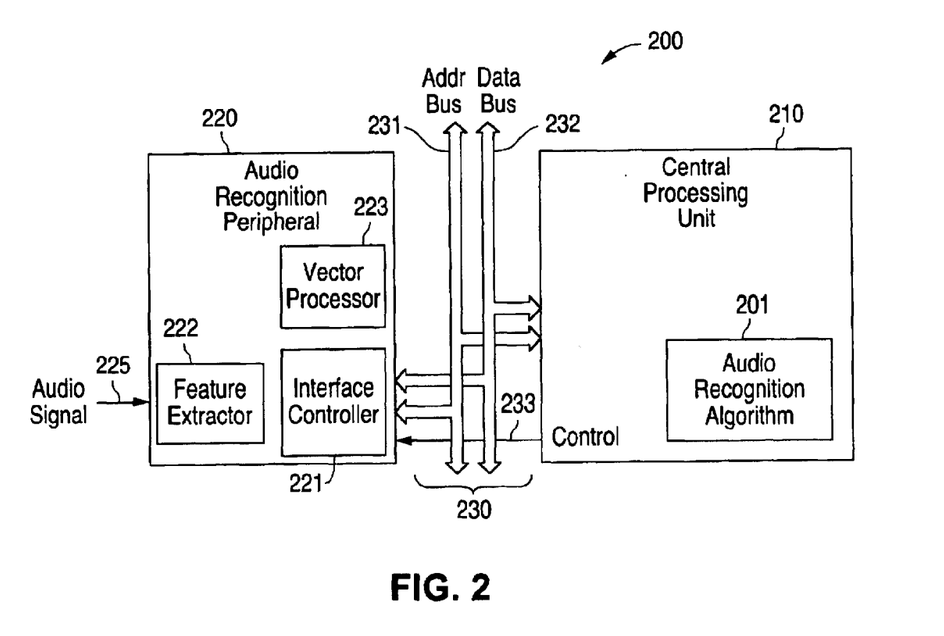
FIG. 2 illustrates an example of an audio recognition peripheral system utilizing an interface controller and vector processor coupled to a central processing unit via a control bus, an address bus, and a data bus according to another embodiment of the present invention.

FIG. 2 shows a block diagram of an audio recognition peripheral system 200 according to another embodiment of the present invention. Audio recognition peripheral system 200 includes a central processing unit (CPU) 210 on a first integrated circuit coupled to an audio recognition peripheral 220 on a second integrated circuit through a bus 230. The bus 230 of FIG. 2 comprises an address bus 231, a data bus 232, and control lines 233. An audio signal 225 is input to the recognition peripheral integrated circuit 220 and received by a feature extractor 222 residing on the recognition peripheral 220. In the embodiment of FIG. 2, the recognition peripheral 220 also includes an interface controller 221 and a vector processor 223 coupled to the bus 230.

To execute an audio recognition operation, the CPU 210 transmits control signals and interface information to the audio recognition peripheral 220 over the bus 230. The control signal and interface information are received at the interface controller 221. The interface controller 221 operates in response the control signals on the control lines 233 and the interface information on the address and data buses 231 and 232. For example, the interface controller 221 may be a state machine or programmable logic array which receives the control signals, address, and data information from the CPU 210 indicating that a feature extractor configuration operation is to occur. The interface controller 221 then generates peripheral configuration signals for configuring the feature extractor in accordance with the particular address and data information that was transmitted by the CPU 210. The control signals input to the interface controller allow the CPU to control the types of operations that are executed by the recognition peripheral. Interface information typically may include address and/or data information for accessing control registers residing on the recognition peripheral and loading such registers with data as will be described in more detail below, for example.

At the beginning of an audio recognition operation, the CPU transmits control signals and interface information for configuring the feature extractor 222 to extract audio recognition features from the audio signal 225. Thereafter, when the audio signal 225 is received by the feature extractor, audio recognition features are extracted to produce feature extraction data. The recognition peripheral then transmits the feature extraction data to the CPU, and the CPU executes the audio recognition algorithm 201 on the feature extraction data.

The audio recognition peripheral 220 of FIG. 2 also includes a vector processor 223 coupled to the interface controller 221 and the central processing unit 210. During execution of the audio recognition algorithm 201 on the feature extraction data, the CPU may send control signals and interface information on the bus 230 to the interface controller 221 indicating that the vector processor is to perform a vector operation. For example, if the audio recognition algorithm 201 is a template based recognition algorithm (e.g. a pattern matching algorithm), the CPU may send control signals, address, and data information on the bus 230 to program the vector processor to calculate the vector distance between two vectors as will be described in more detail below. In another embodiment, the audio recognition algorithm 201 is a neural network based recognition algorithm. In that embodiment the CPU may send control signals, address, and data information on the bus 230 to program the vector processor to perform a multiply-accumulate operation on a plurality of pattern values and neural network weights as will also be described in more detail below. Therefore, in accordance with this embodiment of the present invention, the addition of a vector processor on the audio recognition peripheral 220 further reduces the loading on the CPU 210 during execution of an audio recognition algorithm 201, and thereby improves the ability of a system designer to add highly effective audio recognition functionality simply by adding an audio recognition peripheral 210 to run alongside a processor.

Figure 3:
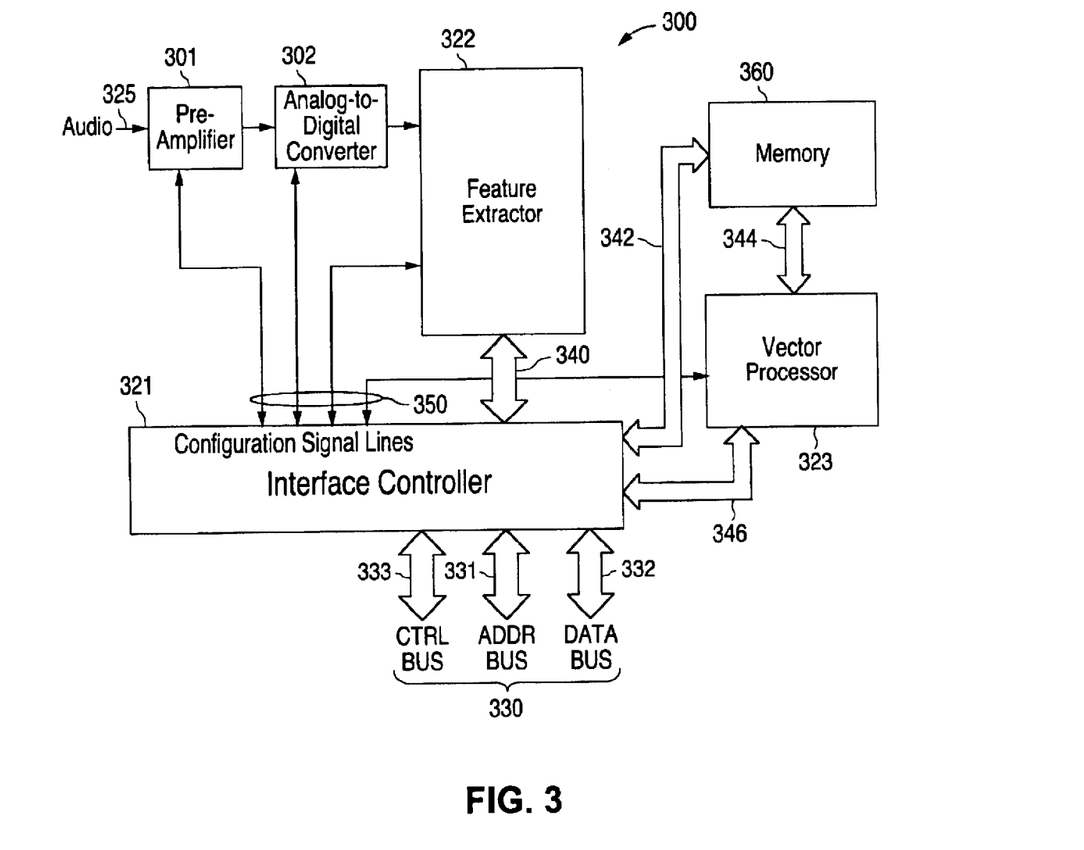
FIG. 3 illustrates an architectural diagram of an audio recognition peripheral on a single integrated circuit according to one embodiment of the present invention.

FIG. 3 shows an architectural diagram of an audio recognition peripheral 300 on a single integrated circuit according to one embodiment of the present invention. The audio recognition peripheral 300 includes a pre-amplifier 301 receiving an audio signal 325. The output of the pre-amplifier 301 is coupled to an analog-to-digital converter 302. The analog-to-digital converter 302 receives the pre-amplified audio signal and converts the signal to a digital audio signal. The digital audio signal is then transmitted to the input of a feature extractor 322. Of course, in other embodiments the audio signal 325 can be received by the audio recognition peripheral 300 as a digital audio signal and input directly into the feature extractor. The feature extractor 322 receives the digital audio signal and extracts audio recognition features to produce feature extraction data. The feature extractor 322 is coupled to an external programmable processing unit (not shown) such as a microprocessor or microcontroller through an interface controller 321. The interface controller 321 of the present embodiment is coupled to a bus 330 comprised of an address bus 331, a data bus 332, and a control bus 333 to allow the audio recognition peripheral 300 to be controlled by an external processing unit. Also included on the audio recognition peripheral 300 of the present embodiment is a vector processor 323 and a memory 360 that are coupled together and to the interface controller for communicating with an external processing unit.

The interface controller 321 also includes configuration signal lines 350 for transmitting peripheral configuration signals between the interface controller 321 and the different elements included on the audio recognition peripheral 300. The peripheral configuration signals on the configuration signal lines 350 may include information from the external processing unit for configuring and/or controlling the pre-amplifier, the digital-to-analog converter, the feature extractor, or the vector processor. For example, during an audio recognition operation, an external processor may configure the audio recognition peripheral 320 by transmitting control, address, and data signals on the bus 330. The interface controller 321 may receive the signals on the bus 330 and generate corresponding peripheral configuration signals on the configuration signal lines to configure the pre-amplifier, the digital-to-analog converter, or the feature extractor. For another example, when the feature extractor is generating feature extraction data in response to an audio signal 325, an external processor may send control, address, and data information on the bus 330 to signal the audio recognition peripheral 300 to transmit the feature extraction data back to the external processor. The interface controller 321 may receive the transmitted signals from the external processor and generate corresponding peripheral configuration signals on the configuration signal lines 350 to cause the feature extractor to transmit the feature extraction data to the data bus over feature extractor output lines 340.

After the feature extraction data has been transmitted to the external processor, an audio recognition algorithm is run on the feature extraction data. As part of the audio recognition algorithm, the external processor may send control, address, and data information over the bus to configure the vector processor to perform a vector operation in accordance with the particular audio recognition algorithm being executed. In one embodiment, the external processor transmits a first input of the vector processor over the bus 330 and directly into the memory 360 on memory input lines 342. The external processor may then configure the vector processor to access the first input directly from the memory 360 into the vector processor using memory interface lines 344.

The vector processor may also be configured to access a second input stored in an external memory (not shown) using vector processor interface lines 346. During a vector operation, the vector processor may signal the external processor to enter a hold state while the vector processor takes control of the bus 330 to access the second input in the external memory. The vector processor will then perform the vector operation by accessing the first input on memory input lines 344 and the second input on vector processor interface lines 346. After performing the vector operation, the vector processor may signal the external processor to exit the hold state and transmit a result back to the external processor for use in the audio recognition algorithm.

In another embodiment, both the first and second inputs to the vector processor are loaded into memory 360 on memory input lines 342. In this case, the external processor configures the vector processor 323 to access both the first input and second input directly from memory 360 over memory interface lines 344. Accordingly, when the vector processor performs a vector operation on the first and second inputs, there is no need to access an external memory. Therefore, in this case the vector processor does not signal the external processor to enter a hold state. This technique has the advantage of allowing the external processor to maintain control of the bus during a vector operation, which allows the external processor to carry out other operations as may be required.

It is important to point out that the inputs to the vector processor, as well as the specific vector operation performed by the vector processor, will vary depending upon the type of audio recognition algorithm running on the external processor. For example, in one embodiment, the external processor executes a template based, or pattern matching, audio recognition algorithm. In that case, the input vectors to the vector processor are vector representations of audio signals also referred to as pattern vectors, which are based on the audio recognition features extracted by the feature extractor. Additionally, the vector operation carried out by the vector processor may be a vector distance calculation. In another embodiment, the external processor executes a neural network based audio recognition algorithm. In that case, one of the input vectors to the vector processor is a vector representation of an audio signal, or pattern vector, based on the audio recognition features, and the other input to the vector processor is a neural network. However, is to be understood that different types of audio recognition algorithms executing on the processor may call for variations in the feature extractor, the vector processor inputs, and the vector operation. Nevertheless, the features and advantages of executing an audio recognition algorithm on a processor coupled to a audio recognition peripheral according to the present invention are intended to cover such variations.

Figure 4:
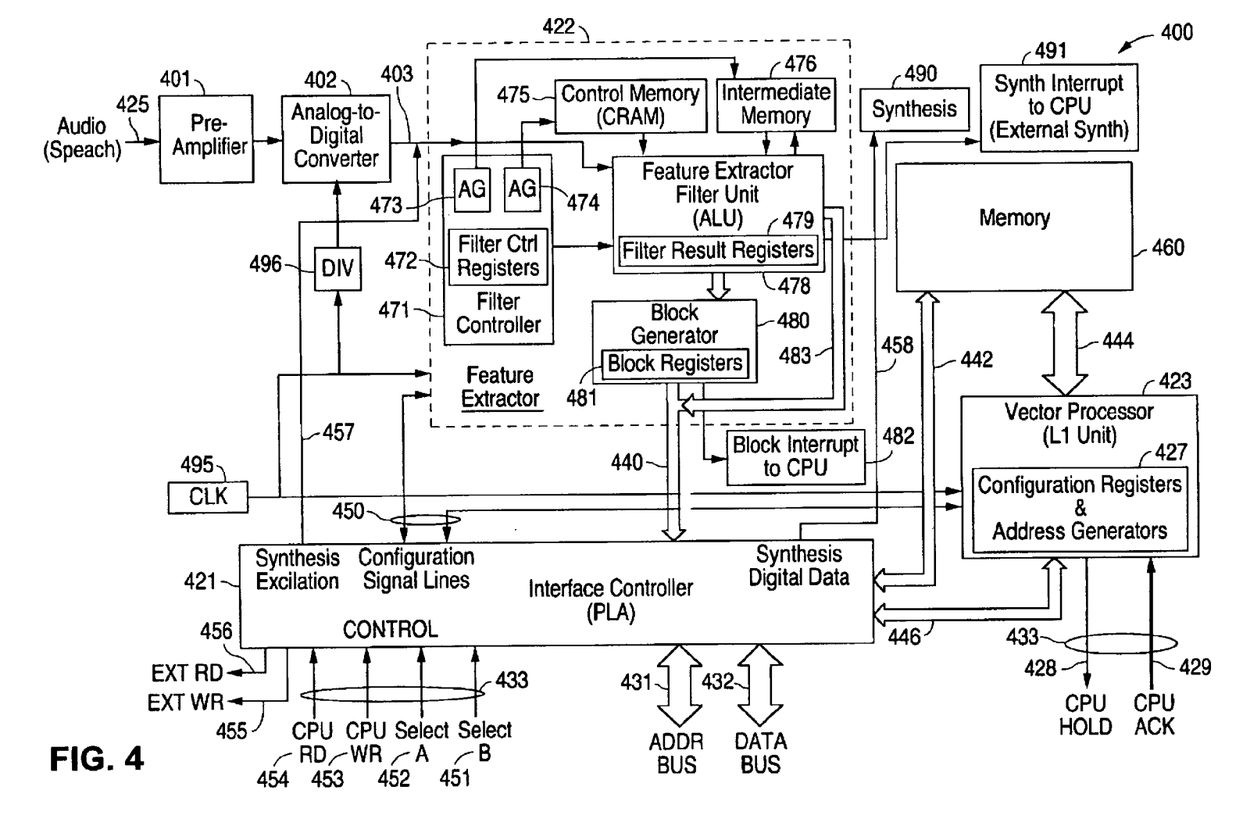
FIG. 4 illustrates an example of an audio recognition peripheral according to another embodiment of the present invention.

FIG. 4 shows an example of an audio recognition peripheral integrated circuit 400 according to another embodiment of the present invention. Audio recognition peripheral 400 includes a pre-amplifier 401, an analog-to-digital converter 402, a feature extractor 422, an interface controller 421, a vector processor 423, and a memory 460. The pre-amplifier 401 receives an audio signal 425, which may be a speech signal as shown in FIG. 4. Accordingly, in one embodiment of the present invention a speech signal is input to the audio recognition peripheral 400 and the audio recognition peripheral system, which includes the peripheral 400 and an external programmable processing unit (not shown), performs speech recognition. After pre-amplifier 401 amplifies the audio signal 425, the signal is converted into a digital audio signal in analog-to-digital converter 402. A digital representation of the speech input signal is transferred from the analog-to-digital converter 425 to a feature extractor 422 on digital lines 403. A system clock 495 is also included in audio recognition peripheral 400, and may be either internally or externally generated. The clock may further be divided by divider 496 prior to clocking analog-to-digital converter 402. The feature extractor 422 receives the digital signal and extracts audio recognition features from the digital audio signal to produce feature extraction data.

For the embodiment of FIG. 4, feature extractor 422 receives the digital audio signal in a feature extractor filter unit 478. In one embodiment, the feature extractor filter unit 478 is an arithmetic logic unit (ALU) for receiving the digital input and calculating a plurality of filtered outputs. The present embodiment of feature extractor 422 also includes a filter controller 471, a block generator 480, a control memory 475, and an intermediate storage memory 476.

Prior to the execution of an audio recognition operation, the external processor configures the feature extractor by transmitting control signals and interface information on a bus to the interface controller. For the embodiment of FIG. 4, the interface controller 421 is coupled to an address bus 431, data bus 432, and control bus 433. To configure the feature extractor, interface information including filter coefficients and control information is received and decoded by the interface controller and transmitted to the feature extractor by peripheral configuration signals on configuration signal lines 450. The filter coefficients and a portion of the control information are stored in the control memory 475. Additionally, a portion of the control information is further loaded into filter control registers 472 in the filter controller 471. The filter controller 471 also includes address generators 473 and 474 to allow the filter controller to access the control memory 475 and intermediate storage memory 476.

During execution of an audio recognition operation, the digital audio signal is filtered in the ALU under the control of the filter controller 471. In one embodiment, a stream of sampled data is received from the analog-to-digital converter 402 in the feature extractor filter 478 at a rate of 18.6 KHz. The stream of sampled data is applied to six different digital filters implemented in the feature extractor filter 478 to produce six different filtered digital waveform streams also at a rate of 18.6 KHz. The six filtered waveforms are then transmitted to the block generator 480 from the filter result registers 479. Block generator 480 receives the six filtered waveforms and performs a running calculation of average power and zero crossings. When 250 outputs have been accumulated, the results are loaded into block registers 481 as feature data blocks, and a block interrupt signal 482 is transmitted to the external processor to indicate that a feature data block is ready to be transmitted by the audio recognition peripheral. In response to the block interrupt signal 482, the external processor transmits control signals and interface information to read the feature data blocks from the block registers 481 over feature extractor output lines 440.

It is important to note that the average power and zero crossings are the parameters that comprise the audio recognition features for this particular embodiment. These parameters are used by the audio recognition algorithm running on the external processor to characterize the audio signal 425. Moreover, the power values and zero crossing values generated by the feature extractor 422 in response to the audio signal 425 comprise the feature extraction data for the present embodiment. The particular parameters used for audio recognition features will depend on the particular audio recognition algorithm that is executed on the external processor. For the present embodiment, the audio recognition algorithm that is executed on the external processor operates in accordance with audio recognition features of average power and zero crossings. Additionally, for a particular algorithm the feature extraction data will comprise values corresponding to the parameters for a particular input signal. The feature extraction data is then applied as an input to the audio recognition algorithm on the external processor. It should be understood however that different techniques of feature extraction may be implemented on the audio recognition peripheral 400 without departing from the spirit and scope of the present invention. Accordingly, different feature extraction techniques may involve different audio recognition features and feature extraction data. Therefore, the feature extractor may require alternative implementations. However, the embodiments described herein are illustrative of the advantages of providing a recognition peripheral system on one integrated circuit, and executing an audio recognition algorithm on an external processor. Therefore, the above embodiment is to be understood as illustrative and not limiting.

One embodiment of the audio recognition peripheral 400 of FIG. 4 may also includes a vector processor 423 and/or memory 460. For audio recognition peripheral 400, the vector processor is designed to calculate the vector distance between two vectors, and is referred to as an "L1 Unit." Additionally, the memory of the present embodiment is a 2K SRAM. During an audio recognition operation, an audio recognition algorithm loaded on the external processor is executed on the feature extraction data. In one embodiment, for example, the audio recognition algorithm is a template matching algorithm. During execution of the algorithm on the feature extraction data, the external processor transmits control signals and interface information to the audio recognition peripheral indicating that a vector operation is to occur in the vector processor. For the template matching algorithm, the external processor loads a vector representation of the audio signal 425 into the memory 460. Additionally, the external processor sends control signals and interface information to configure the vector processor's configuration registers and address generators 427 to access the vector in memory 460 at one of the vector processor's inputs. The vector processor's configuration registers and address generators 427 are also programmed to access a second vector representing a template that is stored in an external memory (not shown) at a second vector processor input. After the external processor has configured the vector processor 423 to access the required input data, the vector processor generates a CPU HOLD signal on control line 428. This signals the external processor that the vector processor is ready to take control of the bus in order to carry out the vector operation. In response to the CPU HOLD signal, the external processor transmits a CPU ACK signal acknowledging that the external processor is ready to give up control of the bus during the vector operation. The vector processor accesses the vector stored in memory 460 over memory input lines 444. The vector processor also accesses the template vector in external memory over vector processor interface lines 446, which are coupled to the address bus 431 and data bus 432 through the interface controller 421. It is important to note, however, that in some embodiments the address bus 431 and/or data bus 432 may flow through the interface controller directly to the vector processor 423 and/or memory 460. This would allow either the vector processor 423 and/or the memory 460 to receive and/or transmit on the address bus and/or data bus directly, controlled by the control signals received at the interface controller 421.

Once the vector processor has control of the bus, it accesses the vector representation of the audio signal 425 in memory 460 beginning at the memory location previously programmed into one of the address generators 427. It also accesses the template vector in external memory beginning at the memory location programmed into another one of the address generators 427. Thereafter, the vector processor 423 calculates the vector distance between the two vectors. Once the vector processor has completed the vector distance calculation, it deactivates the CPU HOLD control line, thereby signaling the external processor that the operation is complete and that the bus is now available. The external processor then sends control signals and interface information to the interface controller 421 to access the registers in the vector processor to read out the result of the vector operation.

In yet another embodiment, the external processor loads both a first vector representation of the audio signal 425 and a second vector representing a template into the memory 460. For this embodiment, the memory 460 may be an 4K SRAM, for example. The external processor then sends control signals and interface information to configure the vector processor's configuration registers and address generators 427 to access the first vector in memory 460 at a first vector processor input and the second vector in memory 460 at a second vector processor input. However, in this embodiment, the vector processor does not generate a CPU HOLD signal on control line 428 to carry out the vector operation because both vector inputs are accessed from peripheral memory 460. Rather, the external processor maintains control of the bus while the vector operation is performed. This embodiment is advantageous because external processor is allowed to access the bus to perform other functions during a vector operation.

It is important to note that the present invention is not limited to the above embodiment utilizing the vector processor for carrying out a distance calculation between two vectors. For example, if the audio recognition algorithm running on the external processor was a neural network recognition algorithm, the vector operation executed by a vector processor may include, for example, loading pattern values and neural network weights into the memory 460. The vector operation in that case would be to perform a multiply-accumulate operation on the pattern values and neural network weights as is well known by those skilled in the art. Accordingly, as further illustrated by the embodiment of FIG. 4, embodiments of the present invention have the advantage of allowing the system designer to offload burdensome vector processing operations associated with audio recognition from the programmable processing unit to the audio recognition peripheral during the execution of the audio recognition algorithm.

Referring again to FIG. 4, the audio recognition peripheral 400 is coupled to an external processor (not shown) through interface controller 421. Interface controller 421 is coupled to an address bus 431 and a data bus 432 for receiving interface information from the external processor. Additionally, the audio recognition system 400 of the embodiment of FIG. 4 includes a control bus comprised of control signal lines 433 coupled to the interface controller 421 and to the vector processor 427. The interface controller is operable in response to the control signals and interface information received from the external processor. In one embodiment of the present invention, the interface controller is coupled to the external processor using an address bus and data bus that are already included as part of the particular external processor selected by the system designer. In other words, the audio recognition peripheral includes an interface controller specifically designed to interface with the bus of a particular microprocessor or microcontroller. Therefore, the audio recognition peripheral 400 may simply be coupled to a standard control, address bus, and data bus of a particular microprocessor or microcontroller thereby easily adding efficient low cost audio recognition functionality.

Figure 5:
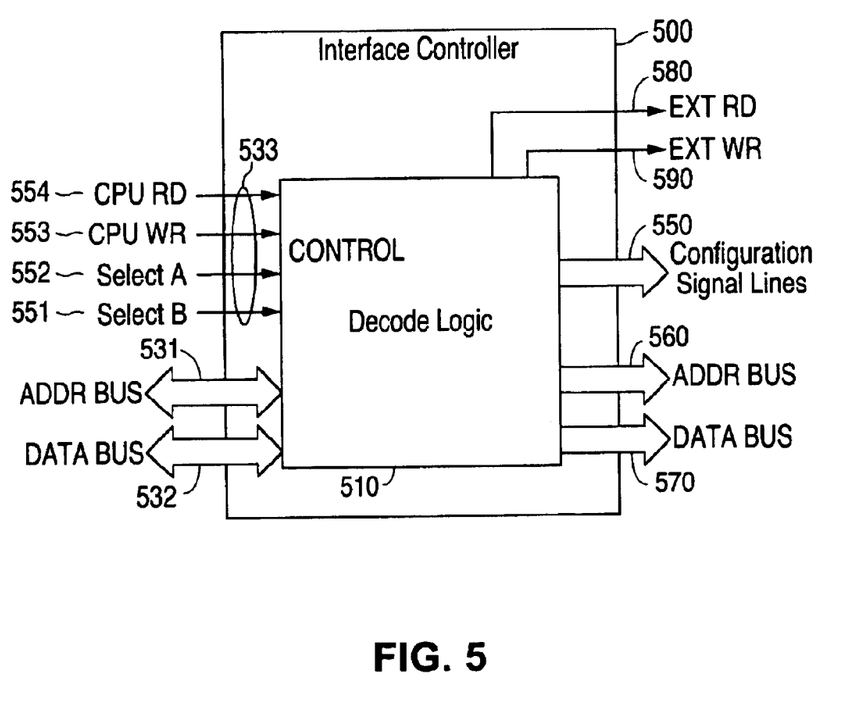
FIG. 5 illustrates decode logic utilized in an interface controller according to one embodiment of the present invention.

Referring now to FIG. 5, the operability of interface controller 421 according to one embodiment of the present invention can be understood. FIG. 5 illustrates decode logic 510 utilized in an interface controller 500. Decode logic 510 receives control signals on control signal lines 533 and interface information on address bus 531 and data bus 532, all from an external processor (not shown). These inputs from the external processor are received and evaluated by the decode logic 510 to generate configuration signals on configuration signal lines 550. The configuration signals, in turn, are used to communicate the control signals and interface information from the external processor to different resources in the audio recognition peripheral, such as the feature extractor or vector processor. The decode logic may be a state machine that produces a specific output in response to a given input as provided by the external processor, for example. In one embodiment, the decode logic is implemented using a programmable logic array (PLA). Decode logic 510 also may pass through the address bus and data bus as shown at 560 and 570. This is because some portions of the audio peripheral system may need to directly transmit or receive information to or from the address or data bus during certain operations, such as when the vector processor accesses an external memory directly, for example.

Referring to FIGS. 4–5 and Table 1, control signaling according to one embodiment is illustrated. In this embodiment, the external processor may access and/or configure different resources of the audio recognition peripheral 400 by transmitting control information to the decode logic 510 on the control signal lines 533. For example, Table 1 below illustrates which resource is accessed in response to different control signals on the Select A line 552 and Select B line 551.

TABLE 1

| Select A | Select B | Peripheral Resource |
| --- | --- | --- |
| 0 | 0 | External Resource |
| 0 | 1 | Memory (SRAM) |
| 1 | 0 | Feature Extractor |
| 1 | 1 | Vector Processor |

Therefore, with reference to Table 1, when the external processor transmits control signals Select A and Select B {A, B}={1, 0}, the decode logic 550 will produce an output on configuration signal lines 550 to communicate with the feature extractor 422. Additionally, when the external processor transmits {A, B}={1, 1}, the decode logic 550 will produce an output on configuration signal line 550 to communicate with the vector processor 423. Moreover, when the external processor transmits {A, B}={0, 1}, the decode logic 550 will produce an output on configuration signal line 550 to communicate with the memory 460. Finally, when the external processor transmits {A, B}={0, 0}, the decode logic 550 produce an output that prevents the audio recognition peripheral resources from accessing the address and/or data buses so the external processor can access another system residing on the bus. Of course, table 1 and the particular choice of control signals are illustrative only, and other variations or modifications could be implemented.

Referring again to FIG. 4, one exemplary operation occurring under the control of the external processor is a feature extraction configuration operation. To configure the feature extractor 422 for an audio recognition operation, the external processor must load the feature extractor with the necessary control information. This is done by accessing filter control registers 472 inside the feature extractor and loading them with the necessary data. The external processor accesses the filter control registers by first sending control signals on the control signal lines Select A and Select B. As mentioned above, the Select A and Select B signal lines of audio recognition peripheral 400 are used to indicate to the interface controller 422 which portion of the peripheral is to be accessed by the external processor. For example, an external processor transmission of {A, B}={1, 0} may indicate to the interface controller 421 that the external processor is going to configure one of the registers in the feature extractor. The external processor then places the address of one of the feature extraction registers on the address bus, and places the corresponding data to be programmed into the register on the data bus. Additionally, the external processor will transmit a control signal on the CPU WR control signal line to indicate that the operation to be performed on the particular register is a write operation. The interface controller receives the control signals {A, B}={1, 0} and will know that the address on the address bus corresponds to the address of a register in the feature extractor, rather than some other register residing in another portion of the audio recognition peripheral with the same address (i.e. a register in the vector processor with the same address for example). Therefore, the interface controller 421 decodes the signals Select A, Select B, CPU WR, and address on the address bus 431 to produce peripheral configuration signals on configuration signal line 450 for programming a register in the feature extractor with data on the data bus 432. According to the same technique, the interface controller 421 can be used to interface the audio recognition peripheral 400 with an external processor to access other registers in the pre-amplifier, the analog-to-digital converter, or the vector processor for configuring the system to perform an audio recognition operation.

As another example of the operation of the interface controller 421, the external processor can also signal the interface controller to transmit feature extraction data from the feature extractor to the external processor as an input to the audio recognition algorithm running on the external processor. In response to a block interrupt signal 482 from the feature extractor, the external processor transmits {A, B}={1, 0} control signals on control signal lines 551 and 552. Additionally, the external processor can place the address of each of the block registers 480 on the address bus. Finally, the external processor transmits a signal on the CPU RD control signal line. These signals are received by the decode logic 510 in the interface controller to produce a configuration signal on the configuration signal lines coupled to the feature extractor. As a result, each of the block registers 480 are accessed and the feature extraction data stored therein is transmitted onto the data bus 432 and into the external processor.

As previously disclosed, during execution of the audio recognition algorithm on the feature extracted data, the external processor may configure the vector processor to perform a vector operation. To perform a vector processor configuration operation, the external processor transmits {A, B}={1, 1} control signals on control signal lines 551 and 552. Additionally, the external processor places the address of one of vector processor configuration registers 427 on the address bus 431 and configuration data to be programmed into the register on the data bus 432. Finally, the external processor transmits a signal on the CPU WR control signal line. These signals are received by the decode logic 510 in the interface controller to produce an configuration signal on the configuration signal lines coupled to the vector processor. As a result, the vector processor configuration register 427 is accessed and the configuration data on the data bus is transmitted therein. The process is repeated for all registers in the vector processor as required for configuration.

In one embodiment of the present invention, the memory 460 is loaded with data directly by the external processor. To load the memory 460, the external processor transmits {A, B}={0, 1} control signals on control signal lines 551 and 552. Additionally, the external processor places the address information on the address bus 431 and data to be programmed into the memory on the data bus 432. These signals are received by the decode logic 510 and, in response to a memory access command {A, B}={0, 1}, the information on the address bus 431 and data bus 432 pass through the interface controller to the memory 460 for storage.

In another embodiment, the external processor accesses an external memory (not shown). To access an external memory, the external processor transmits {A, B}={0, 0} control signals on control signal lines 551 and 552. Additionally, the external processor places the address information on the address bus 431 and data to be programmed into the external memory on the data bus 432. These signals are received by the decode logic 510 and, in response to a external resource access command {A, B}={0, 0}, the decode logic will pass the CPU RD signal 554 and/or CPU WR signal 553 through the system on signal lines EXT RD 580 or EXT WR 590. As a result, the external processor may access other memory on the bus. Similarly, it is to be understood that other additional resources on the bus may be accessed by the external processor.

In yet another embodiment of the present invention, the audio recognition peripheral optionally includes resources for synthesizing audio signals, as well as for recognition. The synthesis technique of the present embodiment allows for the addition of synthesis functionality using the same resources as provided for audio recognition. Therefore, as shown below, a system designer can obtain both audio recognition and audio synthesis at a very low cost and with a drastic reduction on processor loading by utilizing an audio recognition peripheral.

Referring to FIG. 4, in one embodiment, the audio recognition peripheral 400 can be configured into a synthesis mode. To configure the peripheral into synthesis mode, the external processor transmits control signals and interface information to configure the feature extractor 422 for a synthesis operation. The control signals and interface information include filter coefficients and control information for the feature extractor. Then, an excitation function is transmitted to the input of the feature extractor. The excitation function is transmitted from an external processor to the interface controller of the audio recognition peripheral over a bus. The interface controller then transmits the excitation function to the input of the feature extractor over synthesis excitation lines 457. The synthesis excitation lines 457 are coupled to digital lines 403 at the input of the feature extractor 422. During a synthesis operation, the coefficients for the filter are downloaded from the control memory 475 into the feature extractor filter unit 478 to operate on the excitation function. The filter coefficients are programmed according to a linear predictive coding ("LPC") technique to generate an audio output in response to the excitation function provided at the filter input. The feature extractor may also include a synthesis interrupt signal 491 to signal the external processor that synthesis mode filter results are ready to be transmitted.

The filtered excitation signal may be output directly to the interface controller for transmission to the external processor on signal lines 483, which interface with feature extractor output lines 440. The filtered excitation signal is then transmitted back to the external processor for additional operations. Thereafter, a digital representation of an audio waveform is transmitted from the external processor back to the audio recognition peripheral. For a synthesis operation, embodiments of the present invention may include a synthesis block 490 coupled to the interface controller 421 for receiving the digital representation of an audio waveform. In one embodiment, the synthesis block is a pulse width modulation audio generator. However, other techniques for receiving an digital waveform and generating an audio output may include pulse code modulation, or sigma-delta conversion, for example.

In another embodiment of the present invention, an audio recognition peripheral is used to implement record and playback functions. Referring again to FIG. 4, an audio signal (e.g. a speech signal) is received at the input of an audio recognition peripheral. The audio signal is then processed by the feature extractor filter unit and transmitted directly over signal lines 483 to the interface controller and external processor. The recorded audio data may then be compressed by the external processor and stored in some form of memory such as a flash memory on the external processor or in an internal or external SRAM or DRAM. Later, the audio signal may be decompressed by the external processor and transmitted back to the audio recognition peripheral for playback through a synthesizer.

Having fully described at least one embodiment of the present invention, other equivalent or alternative methods of implementing the audio recognition peripheral according to the present invention will be apparent to those skilled in the art. The invention has been described above by way of illustration, and the specific embodiments disclosed are not intended to limit the invention to the particular forms disclosed. For example, the particular implementation of the feature extractor may vary depending upon the particular type of audio recognition algorithm running on the programmable processing unit. Moreover, the control signals allowing the external processor to control the operability of the interface controller may also vary according to the particular implementation. The invention is thus to cover all modifications, equivalents, and alternatives falling within the spirit and scope of the following claims.

What is claimed is:

1. An audio recognition peripheral system comprising:
a first integrated circuit having a programmable processing unit, the programmable processing unit loading an audio recognition algorithm; and
a second integrated circuit having a feature extractor and a vector processor coupled to the first integrated circuit, the feature extractor comprising a feature extractor filter unit coupled to receive an audio signal, a filter controller, and a block generator, the second integrated circuit extracting audio recognition features from the audio signal to produce feature extraction data;
wherein the programmable processing unit receives the feature extraction data and executes the audio recognition algorithm on the feature extraction data and the vector processor performs a specified operation on a plurality of vectors during execution of the audio recognition algorithm.

2. The audio recognition peripheral system of claim 1, wherein the second integrated circuit includes a interface controller coupled to the feature extractor and to the first integrated circuit, the interface controller operating in response to control signals received from the first integrated circuit.

3. The audio recognition peripheral system of claim 2, wherein the interface controller receives interface information from the first integrated circuit, and in accordance therewith, configures the second integrated circuit to perform the audio recognition operation.

4. The audio recognition peripheral system of claim 3, wherein the interface information includes feature extraction control information.

5. The audio recognition peripheral system of claim 4, wherein the feature extraction control information comprises filter coefficients.

6. The audio recognition peripheral system of claim 3, wherein the interface controller receives control signals from the first integrated circuit, and in accordance therewith, transmits the interface information to a designated portion of the second integrated circuit.

7. The audio recognition peripheral system of claim 6, wherein the interface information includes address information and data information, and wherein the address information and the control signals designate a register on the second integrated circuit for receiving the data information.

8. The audio recognition peripheral system of claim 3, wherein the interface information includes information for configuring the vector processor to perform a specified operation during execution of the audio recognition algorithm by the programmable processing unit.

9. The audio recognition peripheral system of claim 1, wherein the specified operation includes determining a vector distance between two vectors.

10. The audio recognition peripheral system of claim 8, wherein the interface information includes a first and second address, wherein the first address corresponds to a memory location of a first vector and the second address corresponds to a memory location of a second vector.

11. The audio recognition peripheral system of claim 1, wherein the second integrated circuit further includes a memory coupled to the first integrated circuit and to the vector processor.

12. The audio recognition peripheral system of claim 1, wherein the first and second integrated circuit are coupled together by a bus.

13. The audio recognition peripheral system of claim 1, wherein the programmable processing unit is a microprocessor.

14. The audio recognition peripheral system of claim 1, wherein the programmable processing unit is a microcontroller.

15. The audio recognition peripheral system of claim 1, wherein the audio signal is a speech signal.

16. The audio recognition peripheral system of claim 1, wherein the audio recognition algorithm is executed during execution of a products functional flow by the programmable processing unit.

17. An audio recognition peripheral system comprising:
on first integrated circuit, processor means for loading an audio recognition algorithm;
on a second integrated circuit, feature extraction means for receiving an audio input signal and extracting audio recognition features from the audio input signal to produce feature extraction data, the feature extraction means comprising a feature extractor filter unit coupled to receive the audio signal, a filter controller, and a block generator, and vector processor means for performing a vector operation during execution of the audio recognition algorithm;
wherein the processing means receives the feature extraction data and executes the audio recognition algorithm on the feature extraction data.

18. The audio recognition peripheral system of claim 17, wherein the second integrated circuit further comprises controller means for receiving control signals from the processor means, the controller means being operable in response to the control signals.

19. The audio recognition peripheral system of claim 17, wherein the second integrated circuit further comprises memory means, coupled to the processor means and to the vector processor means, for storing an input to the vector processor means.

20. On a single integrated circuit, an audio recognition peripheral comprising:
a feature extractor having an audio input for receiving an audio signal, the feature extractor comprising a feature extractor filter unit coupled to receive the audio signal, a filter controller, and a block generator, the feature extractor extracting audio recognition features from the audio signal to produce feature extraction data;
a vector processor; and
an interface controller coupled to the feature extractor and the vector processor, the interface controller having an interface input for receiving external control signals and interface information;
wherein the control signals and interface information configure the vector processor to perform a vector operation on a plurality of vectors during execution of an audio recognition algorithm on an external processor.

21. The audio recognition peripheral of claim 20, the feature extractor further comprising a block generator, the block generator generating feature extraction data and transmitting the feature extraction data external to the integrated circuit.

22. The audio recognition peripheral of claim 20, wherein during execution of an audio recognition algorithm the interface controller receives an external control signal, and in accordance therewith, the interface controller signals the feature extractor to transmit a portion of the feature extraction data external to the integrated circuit.

23. The audio recognition peripheral of claim 20, wherein the interface information includes address and data information, and prior to the execution of an audio recognition algorithm the interface controller receives an external control signal, and in accordance therewith, loads a feature extractor register at the indicated address with the data information.

24. The audio recognition peripheral of claim 23, wherein the data information corresponds to filter coefficients.

25. The audio recognition peripheral of claim 20, wherein the feature extractor further comprises a plurality of registers coupled to the interface controller for configuring the feature extractor.

26. The audio recognition peripheral of claim 20, wherein the feature extractor further comprises:
a filter unit for filtering the audio signal; and
a block generator for generating the feature extraction data.

27. The audio recognition peripheral of claim 26, wherein when the peripheral is in an extraction mode the filter unit receives an audio signal to generate feature extraction data, and when the peripheral is in a synthesis mode the filter unit receives an excitation signal to generate audio information.

28. The audio recognition peripheral of claim 27, further comprising a synthesizer for receiving digital audio information and producing an external analog audio output signal.

29. The audio recognition peripheral of claim 26, wherein the feature extraction data comprises power information and zero crossing information.

30. The audio recognition peripheral of claim 26, wherein the feature extractor further comprises:

a filter memory; and wherein the filter controller is coupled to the filter memory, the filter unit, and the interface controller.

31. The audio recognition peripheral of claim 30, wherein the filter memory comprises a control memory coupled to the filter unit and an intermediate storage memory for storing temporary filter results.

32. The audio recognition peripheral of claim 20, wherein the interface controller further comprises decode logic for decoding the external control signals and interface information.

33. The audio recognition peripheral of claim 32, wherein the interface controller is coupled to an address bus and a data bus, wherein the address bus and control signals are decoded by the decode logic to interface data on the data bus with the feature extractor.

34. The audio recognition peripheral of claim 33, wherein the interface controller, in response to a first control signal, removes the audio recognition peripheral from the address bus and the data bus.

35. The audio recognition peripheral of claim 20, further comprising a memory coupled to the vector processor.

36. The audio recognition peripheral of claim 35, wherein the vector operation includes, during execution of an audio recognition algorithm, programming the memory with a first vector representation of an audio signal, and the vector processor calculating the vector distance between the first vector and a second vector.

37. On a single integrated circuit, an audio recognition peripheral comprising:

feature extractor means for extracting audio information from an audio input signal to produce feature extraction data, the feature extractor means comprising a feature extractor filter unit coupled to receive the audio signal, a filter controller, and a block generator;

vector processor means for performing a vector operation; and interface controller means for receiving external control signals and interface information, the interface controller means configuring the feature extractor means according to the control signals and interface information and configuring the vector processor to perform a vector operation on a plurality of vectors during execution of an audio recognition algorithm on an external processor.

38. The audio recognition peripheral of claim 37, wherein the feature extractor means further comprises block generator means for generating the feature extraction data and transmitting the feature extraction data external to the integrated circuit.

39. The audio recognition peripheral of claim 37, wherein the feature extractor means further comprises register means coupled to the interface controller means for receiving control and interface information, and in accordance therewith, configuring the feature extractor.

40. The audio recognition peripheral of claim 37, wherein the feature extractor means further comprises filter means for receiving the audio signal and producing a filtered waveform.

41. The audio recognition peripheral of claim 37, wherein the interface controller means further comprises decode means for decoding external control signals and interface information.

42. The audio recognition peripheral of claim 37, further comprising memory means, coupled to the vector processor means, for storing inputs to the vector processor.

43. An audio recognition method comprising:

loading an audio recognition algorithm in a first integrated circuit, the first integrated circuit having a programmable processing unit;

receiving an audio signal in a feature extractor on a second integrated circuit the feature extractor comprising a feature extractor filter unit coupled to receive the audio signal, a filter controller, and a block generator;

transmitting the feature extraction data from the second integrated circuit to the first integrated circuit programmable processing unit;

on the first integrated circuit, executing the audio recognition algorithm on the feature extraction data to produce a first vector;

transmitting the first vector from the first integrated circuit to a vector processor on the second integrated circuit;

transmitting a second vector to the vector processor;

performing a vector operation on at least the first and second vectors, and in accordance therewith, generating a result;

transmitting the result to the programmable processing unit on the first integrated circuit for use in the audio recognition algorithm.

44. The method of claim 43, wherein the second integrated circuit includes a block generator, the method further comprising generating the feature extraction data in the block generator.

45. The method of claim 43, wherein the second integrated circuit includes a interface controller, the method further comprising:

receiving the control signals and interface information in the interface controller;

decoding the control signals and interface information in the interface controller to produce peripheral configuration signals; and transmitting the peripheral configuration signals to the feature extractor to configure the feature extractor.

46. The method of claim 43, wherein the second integrated circuit includes a memory, the method further comprising:

storing the first vector and the second vector in the memory; and performing the vector operation on the first vector and the second vector.

47. The method of claim 43, wherein the second integrated circuit includes a first memory and the first integrated circuit is coupled to a second memory, the method further comprising:

storing the first vector in the first memory; and storing the second vector in the second memory.

48. The method of claim 43, wherein the vector processor on the second integrated circuit loads a plurality of pattern values and neural network weights and performs a multiply-accumulate operation.

49. The method of claim 43, wherein audio recognition algorithm is executed in accordance with the execution of a products functional flow by the programmable processing unit.

50. On a single integrated circuit, a method of processing an audio signal for audio recognition comprising:

receiving external control signals and interface information in a interface controller corresponding to the external execution of an audio recognition algorithm, and in accordance therewith, configuring a feature extractor, the feature extractor comprising a feature extractor filter unit coupled to receive the audio signals a filter controller, and a block generator;

receiving said audio signal in the feature extractor;

extracting audio recognition features from the audio signal to produce feature extraction data;

transmitting the feature extraction data external to the integrated circuit;

receiving a first vector from the external integrated circuit in a vector processor;

receiving a second vector in the vector processor;

performing a vector operation on at least the first and second vectors, and in accordance therewith, generating a result; and transmitting the result to external to the integrated circuit for use in the audio recognition algorithm.

51. The method of claim 50, wherein the integrated circuit includes a block generator, the method further comprising generating the feature extraction data in the block generator.

52. The method of claim 50, further comprising:

decoding the control signals and interface information in the interface controller to produce peripheral configuration signals;

transmitting the peripheral configuration signals to the feature extractor to configure the feature extractor.

53. The method of claim 50, further comprising receiving control signals and interface information in the interface controller, and in accordance therewith, configuring a vector processor to perform the vector operation.

54. The method of claim 53, wherein a first register of the vector processor is configured to hold a first address and a second register of the vector processor is configured to hold a second address, the method further comprising:

receiving a first vector representation of the audio signal in a first memory on the integrated circuit, the first address indicating the location of the first vector in the first memory;

calculating the vector distance between the first vector and a second vector stored in a second memory, the second address indicating the location of the second vector in the second memory.

55. The method of claim 53, wherein a first register of the vector processor is configured to hold a first address and a second register of the vector processor is configured to hold a second address, the method further comprising:

receiving a first vector representation of the audio signal in a memory on the integrated circuit, the first address indicating the location of the first vector in the first memory;

calculating the vector distance between the first vector and a second vector stored in the memory, the second address indicating the location of the second vector in the memory.

56. The method of claim 53, wherein the vector operation comprises loading a plurality of pattern values and neural network weights and performing a multiply-accumulate operation.

* * * * *